United States Patent
Dussault et al.

(10) Patent No.: US 10,801,394 B2
(45) Date of Patent: Oct. 13, 2020

(54) ROTARY ENGINE WITH PILOT SUBCHAMBERS

(71) Applicant: PRATT & WHITNEY CANADA CORP., Longueuil (CA)

(72) Inventors: Serge Dussault, Ste-Julie (CA); Andre Julien, Ste-Julie (CA); Michael Lanktree, La Prairie (CA); Edwin Schulz, St-Bruno (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 101 days.

(21) Appl. No.: 15/825,691

(22) Filed: Nov. 29, 2017

(65) Prior Publication Data

US 2019/0162108 A1    May 30, 2019

(51) Int. Cl.

| | |
|---|---|
| *F01C 1/00* | (2006.01) |
| *F01C 1/22* | (2006.01) |
| *F01C 21/18* | (2006.01) |
| *F02B 19/10* | (2006.01) |
| *F02B 53/02* | (2006.01) |
| *F02B 53/10* | (2006.01) |
| *F02B 53/12* | (2006.01) |
| *F02B 53/00* | (2006.01) |

(52) U.S. Cl.
CPC ............ *F02B 19/1095* (2013.01); *F01C 1/00* (2013.01); *F01C 1/22* (2013.01); *F01C 21/18* (2013.01); *F02B 53/10* (2013.01); *F02B 53/02* (2013.01); *F02B 53/12* (2013.01); *F02B 2053/005* (2013.01)

(58) Field of Classification Search
CPC .... F01C 1/00; F01C 1/22; F01C 21/18; F02B 19/1095; F02B 2053/005
See application file for complete search history.

(56) References Cited

U.S. PATENT DOCUMENTS

| | | | |
|---|---|---|---|
| 1,539,133 | A | 5/1925 | Markle et al. |
| 2,093,339 | A | 9/1937 | Pippig |

(Continued)

FOREIGN PATENT DOCUMENTS

| | | |
|---|---|---|
| CN | 102691564 | 9/2012 |
| DE | 1926474 | 1/1970 |

(Continued)

OTHER PUBLICATIONS

NASA Contractor Report 189106, vol. 1, Stratified Charge Rotary Engine Critical Technology Enablement, vol. 1, 1992, pp. 1 to 94, C.E Iron and R.E. Mount, Wood-Ridge, New Jersey.

(Continued)

*Primary Examiner* — Audrey K Bradley
(74) *Attorney, Agent, or Firm* — Norton Rose Fulbright Canada LLP

(57) ABSTRACT

A rotary engine including at least two pilot subchambers each in parallel fluid communication with the internal cavity, so that each pilot subchamber is in fluid communication with the combustion chambers as the rotor rotates. Each of the at least two pilot subchambers in fluid communication with a corresponding pilot fuel injector. At least one ignition source is configured for igniting fuel in the pilot subchambers. A compound engine assembly and a method of combusting fuel in a rotary engine are also discussed.

19 Claims, 5 Drawing Sheets

(56) References Cited

U.S. PATENT DOCUMENTS

| | | | |
|---|---|---|---|
| 2,739,578 A | 3/1956 | Stump | |
| 2,932,289 A | 4/1960 | Witzky | |
| 2,935,054 A | 5/1960 | Franke et al. | |
| 3,044,454 A | 7/1962 | Sutton | |
| 3,058,452 A | 10/1962 | Espenschied | |
| 3,102,521 A | 9/1963 | Slemmons | |
| 3,126,876 A | 3/1964 | Kimberley | |
| 3,246,636 A | 4/1966 | Bentele | |
| 3,391,677 A | 7/1968 | Héjj | |
| 3,508,530 A | 4/1970 | Clawson | |
| 3,512,907 A | 5/1970 | Belzner | |
| 3,722,480 A | 3/1973 | Berkowitz | |
| 3,736,080 A | 5/1973 | Sabet | |
| 3,779,215 A | 12/1973 | Sabet | |
| 3,857,369 A | 12/1974 | Sabet | |
| 3,861,361 A | 1/1975 | Klomp et al. | |
| 3,894,518 A | 7/1975 | Garun et al. | |
| 3,910,238 A | 10/1975 | James | |
| 3,941,097 A | 3/1976 | Seufer et al. | |
| 3,954,088 A | 5/1976 | Scott | |
| 3,957,021 A | 5/1976 | Loyd, Jr. | |
| 3,976,036 A | 8/1976 | Muroki et al. | |
| 3,987,759 A | 10/1976 | Roberts et al. | |
| 4,006,720 A | 2/1977 | Takasi et al. | |
| 4,009,688 A | 3/1977 | Hayashida et al. | |
| 4,029,058 A | 6/1977 | Jones | |
| 4,057,036 A | 11/1977 | Gibson | |
| 4,060,058 A | 11/1977 | Hideg et al. | |
| 4,066,044 A | 1/1978 | Jones et al. | |
| 4,074,956 A | 2/1978 | Maruyama et al. | |
| 4,077,366 A | 3/1978 | Hideg et al. | |
| 4,080,934 A | 3/1978 | Jones | |
| 4,083,329 A | 4/1978 | Myers | |
| 4,085,712 A | 4/1978 | Myers et al. | |
| 4,089,306 A | 5/1978 | Goloff | |
| 4,091,789 A | 5/1978 | Jones | |
| 4,096,828 A | 6/1978 | Satou et al. | |
| 4,108,136 A | 8/1978 | Hideg et al. | |
| 4,186,692 A | 2/1980 | Kawamura et al. | |
| 4,239,023 A | 12/1980 | Simko | |
| 4,259,932 A | 4/1981 | Hideg et al. | |
| 4,270,499 A | 6/1981 | Frelund | |
| 4,323,039 A | 4/1982 | Tsungekawa et al. | |
| 4,483,290 A | 11/1984 | Hass | |
| 4,541,375 A | 9/1985 | Tanaka | |
| 4,577,600 A | 3/1986 | Morita et al. | |
| 4,616,611 A | 10/1986 | Ogawa et al. | |
| 4,619,229 A | 10/1986 | Imoto et al. | |
| 4,635,598 A | 1/1987 | Tanaka et al. | |
| 4,651,692 A | 3/1987 | Morita et al. | |
| 4,662,330 A | 5/1987 | Shioyama et al. | |
| 4,662,331 A | 5/1987 | Ogawa et al. | |
| 4,672,933 A | 6/1987 | Taniguchi et al. | |
| 4,676,207 A | 6/1987 | Kawamura et al. | |
| 4,676,209 A | 6/1987 | Etoh et al. | |
| 4,681,074 A | 7/1987 | Ogawa et al. | |
| 4,699,102 A | 10/1987 | Taniguchi | |
| 4,714,062 A | 12/1987 | Toeda | |
| 4,759,325 A | 7/1988 | Jones | |
| 4,873,952 A | 10/1989 | Narita et al. | |
| 4,875,444 A | 10/1989 | Tsuchida et al. | |
| 4,884,538 A | 12/1989 | Tanaka | |
| 4,899,707 A | 2/1990 | Matsuura | |
| 4,926,817 A | 5/1990 | Imoto et al. | |
| 4,962,736 A | 10/1990 | Matsuo et al. | |
| 5,014,662 A | 5/1991 | Trapy | |
| 5,022,366 A | 6/1991 | Abraham et al. | |
| 5,024,193 A | 6/1991 | Graze | |
| 5,065,714 A | 11/1991 | Matsuoka | |
| 5,109,817 A | 5/1992 | Cherry | |
| 5,168,846 A * | 12/1992 | Paul | F01C 20/16 123/202 |
| 5,178,104 A | 1/1993 | Ito et al. | |
| 5,335,061 A | 8/1994 | Yamamoto et al. | |
| 5,520,864 A | 5/1996 | Frei | |
| 5,522,356 A | 6/1996 | Palmer | |
| 5,524,587 A | 6/1996 | Mallen et al. | |
| 5,540,056 A | 7/1996 | Heberling et al. | |
| 5,678,524 A | 10/1997 | Ofner et al. | |
| 5,709,189 A | 1/1998 | Monnier | |
| 5,720,251 A | 2/1998 | Round et al. | |
| 5,979,395 A | 11/1999 | Mallen et al. | |
| 6,062,188 A | 5/2000 | Okamura | |
| 6,125,813 A | 10/2000 | Louthan et al. | |
| 6,162,034 A | 12/2000 | Mallen | |
| 6,244,240 B1 | 6/2001 | Mallen | |
| 6,321,713 B1 | 11/2001 | Mallen | |
| 6,435,851 B2 | 8/2002 | Mallen | |
| 6,694,944 B2 | 2/2004 | Agama et al. | |
| 6,860,251 B1 | 3/2005 | Reed | |
| 6,892,692 B2 | 5/2005 | Barrett | |
| 7,370,626 B2 | 5/2008 | Schubert | |
| 7,753,036 B2 | 7/2010 | Lents et al. | |
| 7,775,044 B2 | 8/2010 | Julien et al. | |
| 7,832,372 B2 | 11/2010 | Blank | |
| 7,950,364 B2 | 5/2011 | Nerheim | |
| 8,033,264 B2 | 10/2011 | Lauter | |
| 9,038,594 B2 | 5/2015 | Thomassin et al. | |
| 9,057,321 B2 | 6/2015 | Reitz et al. | |
| 9,121,277 B2 | 9/2015 | Gekht et al. | |
| 9,200,563 B2 | 12/2015 | Thomassin | |
| 9,217,360 B2 | 12/2015 | Pierz | |
| 9,334,794 B2 | 5/2016 | Gaul et al. | |
| 9,353,680 B2 | 5/2016 | Villeneuve et al. | |
| 9,399,947 B2 | 7/2016 | Schulz et al. | |
| 9,528,434 B1 | 12/2016 | Thomassin et al. | |
| 9,638,093 B2 | 5/2017 | Blank | |
| 9,664,047 B2 | 5/2017 | McDaniel et al. | |
| 2008/0000215 A1 | 1/2008 | Duncan | |
| 2009/0309475 A1 | 12/2009 | Tozzi | |
| 2012/0227397 A1 | 9/2012 | Willi et al. | |
| 2013/0025567 A1 | 1/2013 | Thomassin et al. | |
| 2013/0160734 A1 | 6/2013 | Redtenbacher et al. | |
| 2013/0321612 A1 | 12/2013 | Bousquet et al. | |
| 2014/0251258 A1 | 9/2014 | Thomassin et al. | |
| 2014/0261293 A1 | 9/2014 | Schulz et al. | |
| 2015/0240710 A1* | 8/2015 | Thomassin | F01C 1/22 123/209 |
| 2015/0275749 A1 | 10/2015 | Thomassin | |
| 2015/0275756 A1 | 10/2015 | Bolduc et al. | |
| 2016/0053667 A1 | 2/2016 | Loetz et al. | |
| 2016/0245163 A1* | 8/2016 | Lamarre | F01C 11/008 |

FOREIGN PATENT DOCUMENTS

| | | |
|---|---|---|
| DE | 10121036 | 11/2002 |
| DE | 102011083143 | 3/2013 |
| EP | 2497902 | 9/2012 |
| EP | 2551448 | 1/2013 |
| GB | 1193878 | 6/1970 |
| JP | 49-12220 | 2/1974 |
| JP | 58-162721 | 9/1983 |
| JP | 59-007726 | 1/1984 |
| JP | 59-046317 | 3/1984 |
| JP | 59017252 | 4/1984 |
| JP | 6093124 | 5/1985 |
| JP | 61-083451 | 4/1986 |
| JP | 61-093227 | 5/1986 |
| JP | 61-123714 | 6/1986 |
| JP | 62-010418 | 1/1987 |
| JP | 628345 | 2/1987 |
| JP | 63179134 | 7/1988 |
| JP | 63179136 | 7/1988 |
| JP | S63159614 | 7/1988 |
| JP | S6480722 | 3/1989 |
| JP | 01-151722 | 6/1989 |
| JP | 3003940 | 1/1991 |
| JP | 3199627 | 8/1991 |
| JP | 04-140418 | 5/1992 |
| JP | 4-298641 | 10/1992 |
| JP | 6221176 | 8/1994 |
| JP | 3210027 | 7/2001 |
| JP | 3233138 | 9/2001 |
| JP | 4031630 | 10/2007 |

(56) References Cited

FOREIGN PATENT DOCUMENTS

| JP | 2011-122598 | 6/2011 |
|----|-------------|--------|
| RU | 2387851 | 12/2009 |
| SK | 6949 | 6/2014 |
| WO | 9857037 | 12/1998 |
| WO | 2008043154 | 4/2008 |
| WO | 2011092365 | 8/2011 |

OTHER PUBLICATIONS

Rotary Engine by Kenichi Yamamoto, 1981.
Barney Gaylord, Finding Top Dead Center (TDC) Casually—CS-111A, The MGA with an Attitude, 2012, pp. 1/2, Aug. 4, 2017.

* cited by examiner

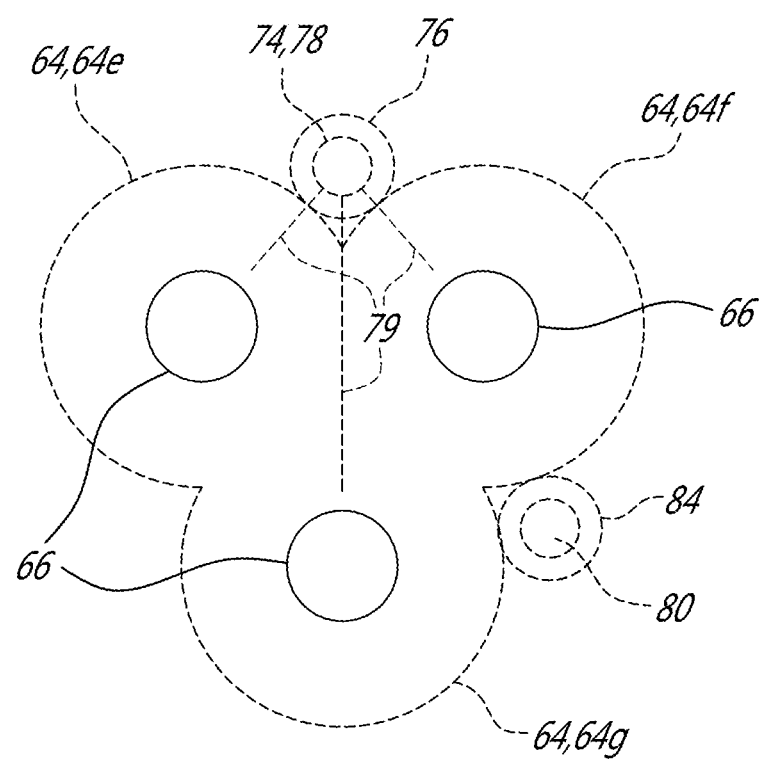

ROTARY ENGINE WITH PILOT SUBCHAMBERS

TECHNICAL FIELD

This application relates generally to rotary internal combustion engines, more particularly to the combustion in such engines.

BACKGROUND OF THE ART

Some Wankel engines include a single pilot subchamber in which a pilot fuel injection is performed. The pilot fuel is ignited in the pilot subchamber and transferred to the main combustion chamber so as to ignite the fuel injected therein by a main fuel injector.

SUMMARY

In one aspect, there is provided a rotary engine comprising: a rotor sealingly received within an internal cavity of a housing to define a plurality of combustion chambers; an intake port and an exhaust port in use in fluid communication with the combustion chambers as the rotor rotates; at least two pilot subchambers in parallel fluid communication with the internal cavity, the at least two pilot subchambers in use in fluid communication with the combustion chambers as the rotor rotates; a main fuel injector in use in fluid communication with the combustion chambers as the rotor rotates, the main fuel injector located upstream of the at least two pilot subchambers with respect to a direction of rotation of the rotor; at least one pilot fuel injector in fluid communication with the at least two pilot subchambers; and at least one ignition source configured for igniting fuel in the at least two pilot subchambers.

In another aspect, there is provided a method of combusting fuel in a rotary engine, the method comprising: injecting a pilot quantity of fuel into at least two pilot subchambers; injecting a main quantity of fuel directly into a combustion chamber of the rotary engine, the pilot quantity smaller than the main quantity; igniting the pilot quantity of fuel within the at least two pilot subchambers; directing the ignited pilot quantity of fuel from each of the at least two pilot subchambers into the combustion chamber in parallel, including partially restricting a flow of the ignited fuel between the pilot subchambers and the combustion chamber; and igniting the main quantity of fuel within the combustion chamber with the ignited pilot quantity of fuel.

DESCRIPTION OF THE DRAWINGS

Reference is now made to the accompanying figures in which:

FIGS. 4-6 are schematic views of part of an inner surface of a wall of the rotary engine of FIG. 2 or 3, showing pilot subchambers configured in accordance with alternate embodiments.

DETAILED DESCRIPTION

Figure 1:
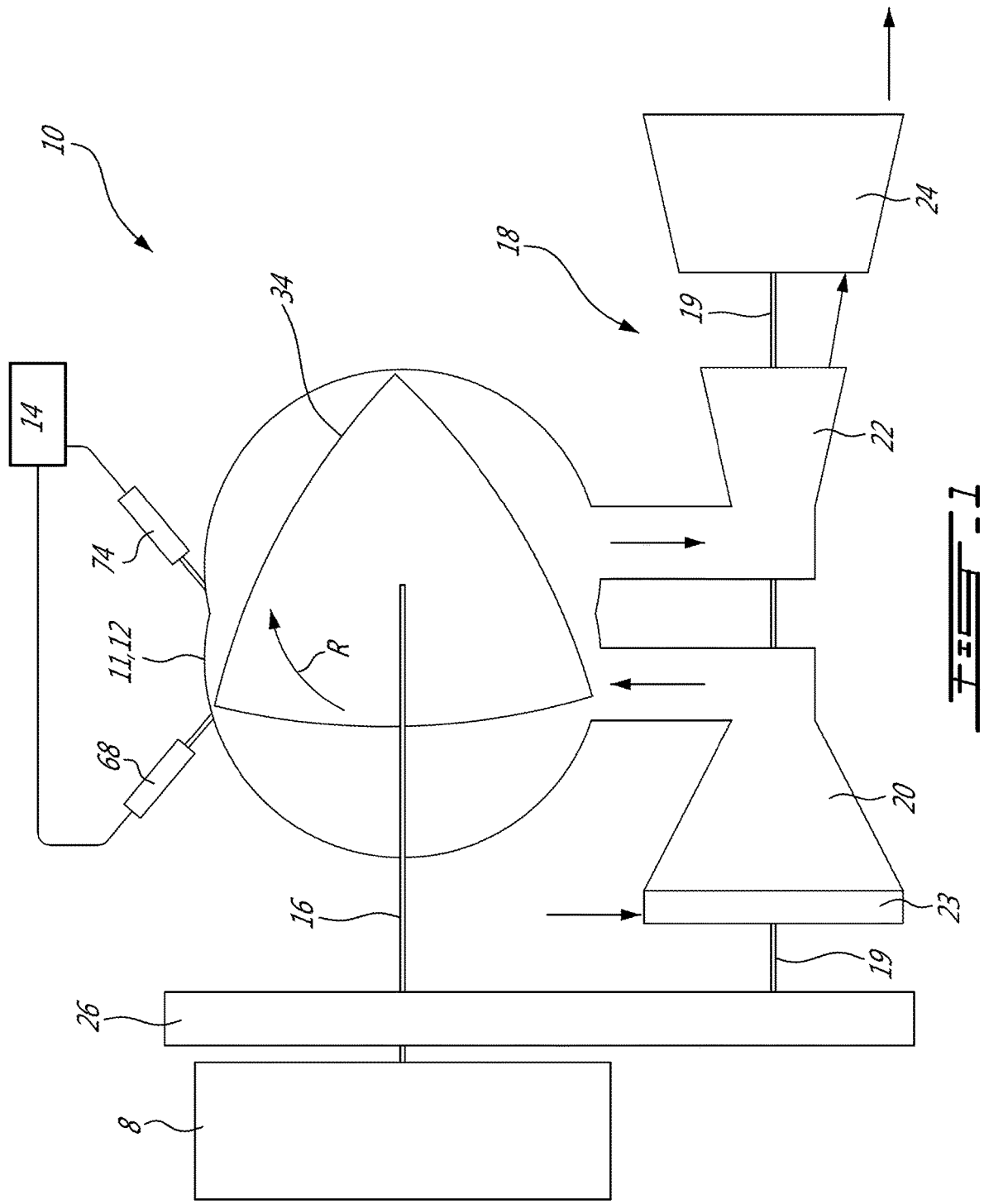
FIG. 1 is a schematic cross-sectional view of an engine assembly in accordance with a particular embodiment.

FIG. 1 illustrates a compound engine assembly 10 in accordance with a particular embodiment, which may be configured for example as a turboprop engine, a turboshaft engine, a turbofan engine, or an auxiliary power unit (APU). The engine assembly 10 generally includes a compressor 20, an intermittent internal combustion engine 12 configured for example as a liquid cooled heavy fueled multi-rotor rotary intermittent combustion engine, and a turbine section 18 including one or more turbines.

The outlet of the compressor 20 is in fluid communication with the inlet of the engine 12; although not shown, such communication may be performed through an intercooler so as to reduce the temperature of the compressed air prior to the compressed air entering the engine 12. In the embodiment shown, the compressor 20 includes variable inlet guide vanes 23 through which the air flows before reaching the rotor(s) of the compressor 20. The compressor 20 may be a single-stage device or a multiple-stage device and may include one or more rotors having radial, axial or mixed flow blades.

A source of fuel 14 is in fluid communication with fuel injectors 68, 74 (further described below) of the engine 12. In a particular embodiment, the source of fuel 14 is a source of heavy fuel e.g. diesel, kerosene, jet fuel, equivalent biofuel; other suitable types of fuel may alternately be used, including, but not limited to, "light fuel" such as gasoline and naphtha. In the engine 12 the compressed air is mixed with the fuel and combusted to provide power and a residual quantity of exhaust gas. The engine 12 drives an engine shaft 16 and provides an exhaust flow in the form of exhaust pulses of high pressure hot gas exiting at high peak velocity. The outlet of the engine 12 is in fluid communication with the inlet of the turbine section 18, and accordingly the exhaust flow from the engine 12 is supplied to the turbine(s) of the turbine section 18.

The turbine section 18 includes at least one turbine rotor engaged on a turbine shaft 19. In a particular embodiment, the turbine section 18 includes a first stage turbine 22 receiving the exhaust from the engine 12, and a second stage turbine 24 receiving the exhaust from the first stage turbine 22; each turbine 22, 24 may be a single-stage device or a multiple-stage device and may include one or more rotors having radial, axial or mixed flow blades. In a particular embodiment, the turbines 22, 24 have different reaction ratios from one another. In a particular embodiment, the first stage turbine 22 is configured to take benefit of the kinetic energy of the pulsating flow exiting the engine 12 while stabilizing the flow and the second stage turbine 24 is configured to extract energy from the remaining pressure in the flow. Accordingly, in a particular embodiment the reaction ratio of the first stage turbine 22 is lower than the reaction ratio of the second stage turbine 24. Other configurations are also possible.

Power from the engine 12 and turbines 22, 24 is compounded to drive a rotatable load 8, for example via a gearbox 26 defining a driving engagement between the engine shaft 16, the turbine shaft 19 and the rotatable load 8. The rotatable load 8 may be any suitable type of load including, but not limited to, one or more generator(s), propeller(s), helicopter rotor mast(s), fan(s), compressor(s), or any other appropriate type of load or combination thereof. It is understood that the power from the engine shaft 16 and turbine shaft 19 may be compounded using any other suitable type of engagement, including, but not limited to, by having each shaft engaged to a respective electrical motor/ generator with power being transferable between the electrical motor/generators (electrical compounding).

In the embodiment shown, the compressor 20 is driven by the turbine section 18, by having the rotor(s) of the compressor 20 directly engaged to the turbine shaft 19. Alternately, the rotor(s) of the compressor 20 may be connected to a separate shaft driven by the turbine shaft 19 and/or the engine shaft 16, for example via the gearbox 26 or via a separate gearbox.

It is understood that the engine assembly 10 shown is provided as an example only, and that the engine assembly 10 may have any other suitable configuration, including, but not limited to, the configuration of the compound cycle engine system or compound cycle engine such as described in Lents et al.'s U.S. Pat. No. 7,753,036 issued Jul. 13, 2010, or such as described in Julien et al.'s U.S. Pat. No. 7,775,044 issued Aug. 17, 2010, or such as described in Thomassin et al.'s U.S. patent publication No. 2015/0275749 published Oct. 1, 2015, or such as described in Bolduc et al.'s U.S. patent publication No. 2015/0275756 published Oct. 1, 2015, the entire contents of all of which are incorporated by reference herein. For example, the compound engine assembly 10 may be configured as a single shaft engine assembly. The compound engine assembly 10 may be used as a prime mover engine, such as on an aircraft or other vehicle, or in any other suitable application.

Moreover, it is understood that the engine assembly 10 may have other configurations than that of a compound engine assembly. For example, the turbine section 18 may be omitted, or may rotate independently of the internal combustion engine 12. The compressor 20 may be omitted. For example, the internal combustion engine 12 may have its inlet and outlet in direct communication with ambient air, i.e. be used without being fluidly connected to a compressor and a turbine.

In the embodiment shown, the engine 12 is a rotary intermittent internal combustion engine including two or more rotor assemblies 11 drivingly engaged to the engine shaft 16. In another embodiment, the engine 12 includes a single rotor assembly 11. In a particular embodiment, the rotor assembly(ies) 11 are configured as Wankel engines.

Figure 2:
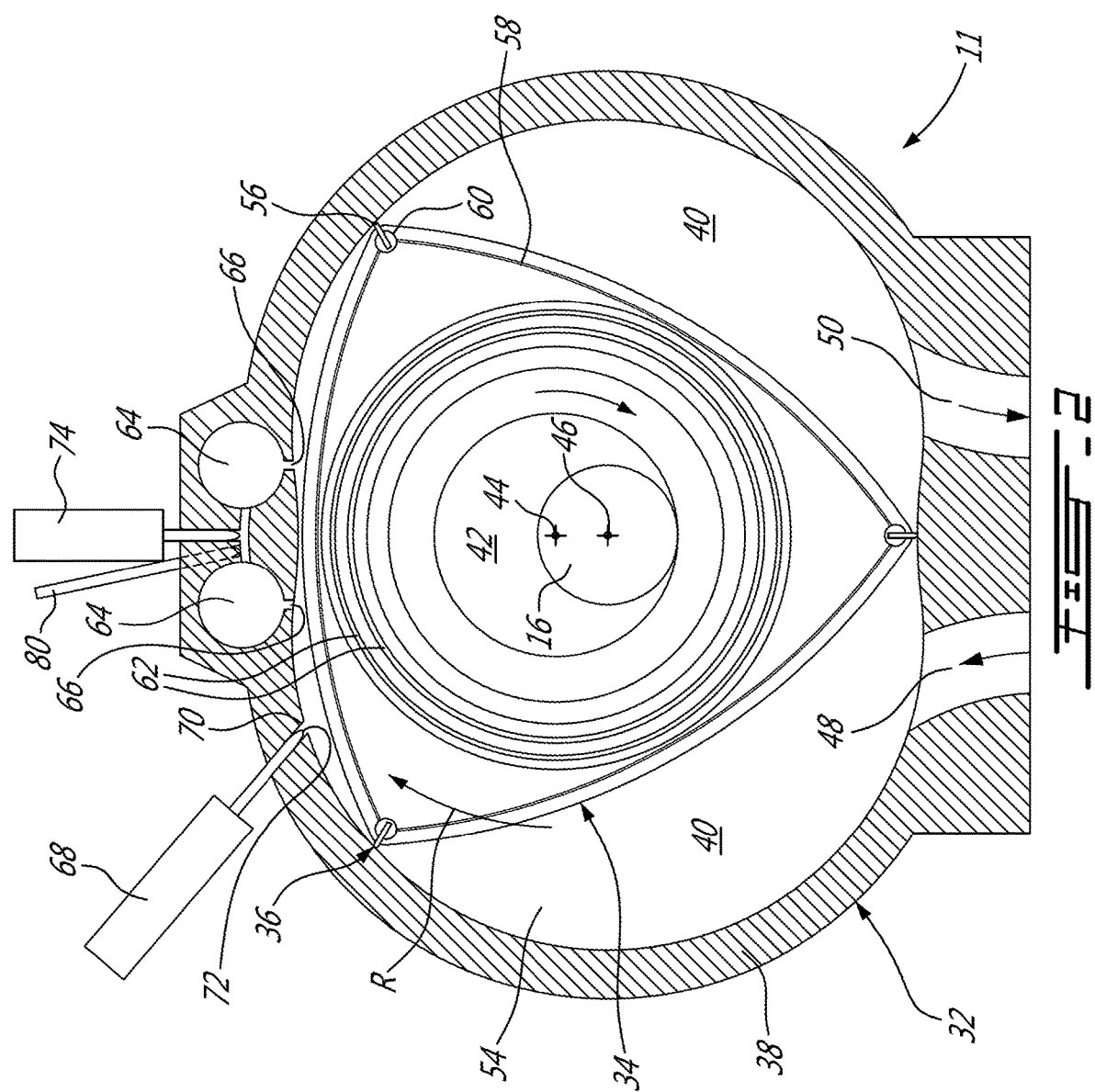
FIG. 2 is a schematic cross-sectional view of a rotary engine which may be used in the engine assembly of FIG. 1, in accordance with a particular embodiment.

Referring to FIG. 2, an example of a Wankel engine which may define a rotor assembly 11 of the engine 12 is shown. It is understood that the configuration of the rotor assembly 11, e.g. placement of ports, number and placement of seals, number of apex portions, combustion chambers, etc., may vary from that of the embodiment shown.

The rotor assembly 11 comprises a housing 32 defining an internal cavity having a profile defining two lobes, which is preferably an epitrochoid. A rotor 34 is received within the internal cavity. The rotor 34 in this embodiment defines three circumferentially-spaced apex portions 36, and a generally triangular profile with outwardly arched sides. The apex portions 36 are in sealing engagement with the inner surface of a peripheral wall 38 of the housing 32 to form and separate three combustion chambers 40 of variable volume between the rotor 34 and the housing 32. The peripheral wall 38 extends between two axially spaced apart end walls 54 to surround the internal cavity.

The rotor 34 is in driving engagement with the engine shaft 16, by being engaged to an eccentric portion 42 of the engine shaft 16 to perform orbital revolutions within the internal cavity. The engine shaft 16 performs three rotations for each orbital revolution of the rotor 34. The geometrical axis 44 of the rotor 34 (and of the eccentric portion 42) is offset from and parallel to the central axis 46 of the housing 32 (and of the shaft 16). During each revolution of the rotor 34, each combustion chamber 40 varies in volume and moves around the internal cavity to undergo the four phases of intake, compression, expansion and exhaust.

For efficient operation the combustion chambers 40 are sealed by spring-loaded peripheral or apex seals 56 extending from the rotor 34 to engage the inner surface of the peripheral wall 38, and spring-loaded face or gas seals 58 and end or corner seals 60 extending from the rotor 34 to engage the inner surface of the end walls 54. The rotor 34 also includes at least one spring-loaded oil seal ring 62 biased against the inner surface of the end wall 54 around the bearing for the rotor 34 on the shaft eccentric portion 42.

An intake port 48 is defined through the housing 32, for example through the peripheral wall 38. The intake port 48 is in fluid communication with the combustion chambers 40 as the rotor 34 rotates, i.e. in fluid communication with each of the combustion chambers 40 in a successive manner, for admitting air (in the embodiment of FIG. 1, compressed air from the compressor 20) into each of the combustion chambers 40 one after the other. The intake port(s) 48 of the rotor assembly(ies) 11 together define the inlet of the engine 12. An exhaust port 50 is also provided through the housing 32, for example through the peripheral wall 38. The exhaust port 50 is in fluid communication with the combustion chambers 40 as the rotor 34 rotates, i.e. in fluid communication with each of the combustion chambers 40 in a successive manner, for discharge of the exhaust gases from each of the combustion chambers 40 one after the other (which in the embodiment of FIG. 1 is then circulated to the turbine section 18). The exhaust port(s) 50 of the rotor assembly(ies) 11 together define the exhaust of the engine 12. Alternately, the intake port 48 and the exhaust port 50 may be provided through the end or side wall 54 of the housing 32.

The effective volumetric expansion ratio of a combustion chamber 40 can be defined as the ratio between the maximum working volume during the portion of the expansion phase where the combustion chamber 40 does not communicate with the exhaust port 50, and the minimum working volume during the expansion phase. The effective volumetric compression ratio of a combustion chamber 40 can be defined as the ratio between the maximum working volume during the portion of the compression phase where the combustion chamber 40 does not communicate with the intake port 48, and the minimum working volume during the compression phase. In a particular embodiment, the combustion chambers 40 all have the same effective volumetric compression ratio, which is considered to be the effective volumetric compression ratio of the engine 12, and the combustion chambers 40 all have the same effective volumetric expansion ratio, which is considered to be the effective volumetric expansion ratio of the engine 12. In a particular embodiment, the engine 12 operates under the Miller cycle, i.e., with a lower effective volumetric compression ratio than its effective volumetric expansion ratio. This may be obtained, for example, by positioning the intake port 48 to be closer to top dead center (TDC) than the exhaust port 50 to reduce the effective volumetric compression ratio. Alternately, the effective volumetric compression and expansion ratios of the engine 12 may be similar or equal to each other.

A main fuel injector 68 is in direct fluid communication with the combustion chambers 40 as the rotor 34 rotates, i.e. in direct fluid communication with each of the combustion chambers 40 in a successive manner, so as to inject a main quantity of fuel in each of the combustion chambers 40 one after the other. The main fuel injector 68 is located downstream of the intake port 48 with respect to the direction of rotation R of the rotor 34. The main fuel injector 68 is a direct fuel injector, i.e. it communicates directly with the internal cavity. A main injector opening 70 is defined through the peripheral wall 38 (as shown) or the end wall 54, and extends through the inner surface of the internal cavity. The main fuel injector 68 is received in the main injector opening 70 with its tip 72 adjacent the internal cavity. In a particular embodiment, the main injector opening 70 is configured so as to avoid interfering with (e.g. restricting) the fuel flow from the main fuel injector 68 to the internal cavity.

Figure 3:
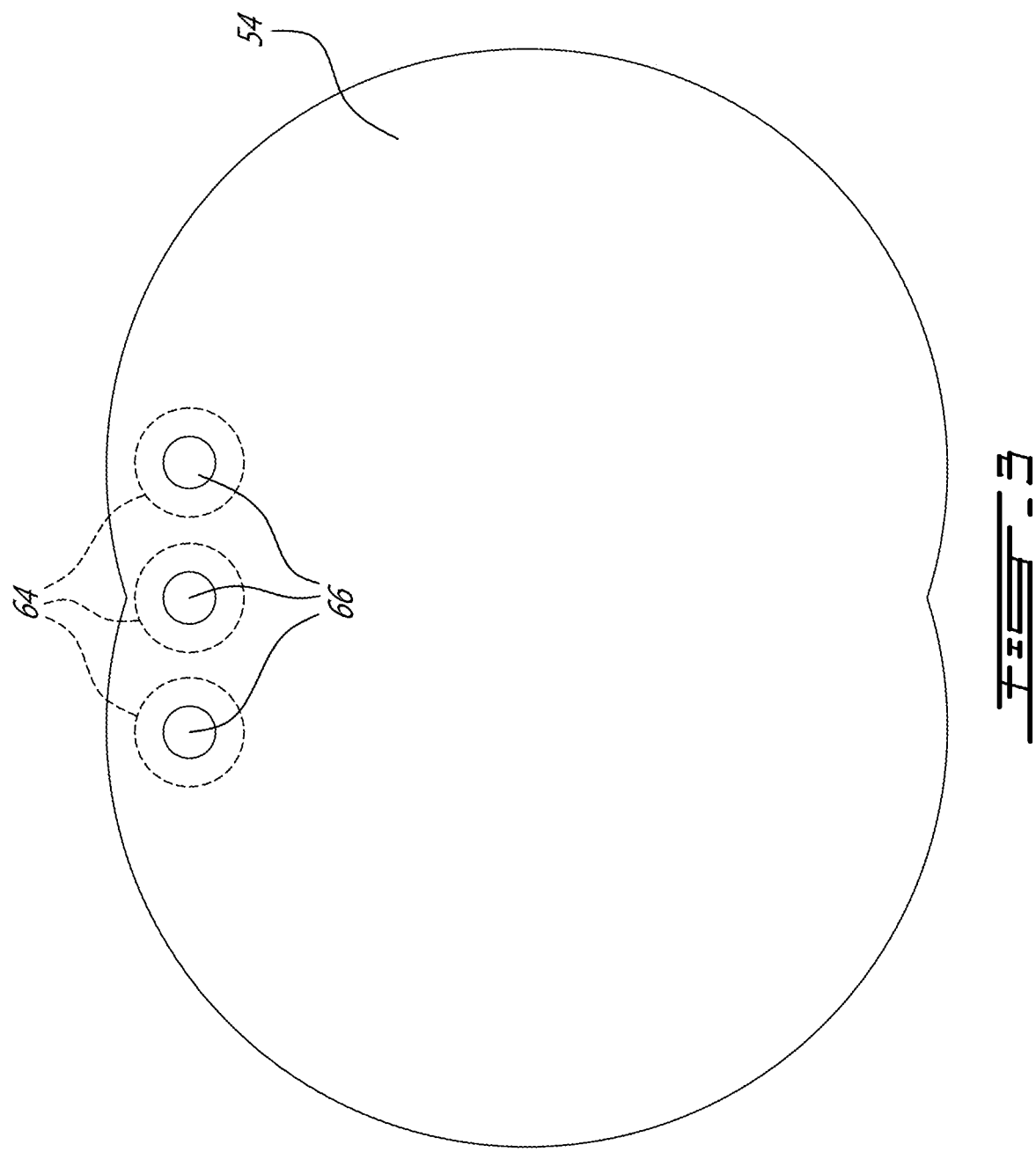
FIG. 3 is a schematic view of an end wall of a rotary engine which may be used in the engine assembly of FIG. 1, showing pilot subchambers in accordance with a particular embodiment.

The rotor assembly 11 includes two or more pilot subchambers 64 in parallel fluid communication with the internal cavity of the housing 32, so as to be in fluid communication with each of the combustion chambers 40 in a successive manner as the rotor 34 rotates. The pilot subchambers 64 are located downstream of the main fuel injector 68 with respect to the direction of rotation R of the rotor 34. In the embodiment shown, the pilot subchambers 64 are located in or are adjacent the peripheral wall 38 of the rotor assembly 11, and each communicate with the internal cavity through a respective transfer hole 66 defined through the peripheral wall 38 and in successive fluid communication with the combustion chambers 40 as the rotor 34 rotates. In another embodiment and as illustrated by FIG. 3, the pilot subchambers 64 are located in or adjacent the end wall 54 of the rotor assembly 11, and the respective transfer hole 66 defined the fluid communication with the internal cavity extends through the end wall 54. Alternately, the pilot subchambers 64 may include at least one pilot subchamber 64 located in or are adjacent the peripheral wall 38 and at least one pilot subchamber 64 located in or are adjacent one or each of the end walls 54.

As shown in FIGS. 2-3, the transfer holes are spaced apart from each other. Although a single transfer hole 66 is shown for each of the pilot subchambers 66, it is understood that alternately two or more respective transfer holes may be defined for each of the pilot subchambers 66.

In the embodiments shown, the pilot subchambers 64 each have a circular cross-section; alternate shapes are also possible. The pilot subchambers 64 have a shape forming a reduced cross-section adjacent the transfer hole(s) 66, such that the transfer hole(s) 66 define(s) a restriction to the flow between the pilot subchamber 64 and the internal cavity. In a particular embodiment, the transfer holes 66 have a circular cross-section, but may alternately have any suitable shape and configuration.

The pilot subchambers 64 may all have the same volume, or may have different volumes from one another. In a particular embodiment, three or four pilot subchambers 64 are provided, and the pilot subchambers 64 all have a same volume. In another embodiment, one of the pilot subchambers 64 is configured as an "intermediate chamber" and is significantly larger than that of the remaining pilot subchamber(s), so as to receive and burn a larger quantity of fuel than the remaining pilot subchamber(s); in this case, the ratio of the volume of the intermediate chamber to that of the remaining pilot remaining pilot subchamber(s) may be proportional to the quantity of fuel injected in each. In a particular embodiment, the total volume of the pilot subchambers 64 is at least 0.5% of the displacement volume and/or at most to 3.5% of the displacement volume, with the displacement volume being defined as the difference between the maximum and minimum volumes of one combustion chamber 40. In another particular embodiment, the total volume of the pilot subchambers 64 is at least 0.625% of the displacement volume and/or at most 1.25% of the displacement volume. In another particular embodiment, the total volume of the pilot subchambers 64 is at most 10% of the displacement volume, for example when up to 50% of the total quantity of fuel is burned in the pilot subchambers 64. Other values are also possible.

The volume of the pilot subchambers 64 may also be defined as a portion of the combustion volume, which is the sum of the minimum chamber volume $V_{min}$ (including any recess defined in the rotor, if applicable) and the total volume $V_p$ of the pilot subchambers 64. In a particular embodiment the total volume $V_p$ of the pilot subchambers 64 is at least 5% of the combustion volume and/or at most 25% of the combustion volume, i.e. $V_p$=at least 5% and/or at most 25% of $(V_p+V_{min})$. In another particular embodiment, the total volume $V_p$ of the pilot subchambers 64 is at least 10% and/or at most 12% of the combustion volume, i.e. $V_p$=at least 10% and/or at most 12% of $(V_p+V_{min})$. In another particular embodiment, the total volume $V_p$ of the pilot subchambers 64 is at most 70% of the combustion volume, i.e. $V_p$=at most 70% of $(V_p+V_{min})$, for example when up to 50% of the total quantity of fuel is burned in the pilot subchambers 64. Other values are also possible.

Although not shown, the pilot subchambers 64 may be defined in an insert (e.g. one insert per pilot subchamber 64, common insert defining multiple pilot subchambers 64) made of a material having a greater heat resistance than that of the of the material of the wall receiving the insert (peripheral wall 38 and/or end wall 54), and in a particular embodiment of a material having a greater heat resistance than that of the material forming a remainder of the housing 32. In a particular embodiment, the peripheral wall 38 and end wall 54 are made of aluminium. Non-limiting examples of such inserts are provided in U.S. Pat. No. 9,038,594, which is incorporated by reference herein.

Still referring to FIG. 2, each pilot subchamber 64 is in fluid communication with a corresponding pilot fuel injector 74. In the embodiments shown (FIGS. 1-6), a single, common pilot fuel injector 74 is in fluid communication with all of the pilot subchambers 64, as will be further detailed below. Alternately, more than one pilot fuel injector 74 may be provided; for example, each pilot subchamber 64 may have a respective pilot fuel injector 74. The pilot fuel injector(s) 74 inject a pilot quantity of fuel in the pilot subchambers 64 for each combustion event of the combustion chambers 40.

At least one ignition source 80 is configured for fuel ignition in the pilot subchambers 64, so as to perform ignition of the pilot quantity of fuel within the pilot subchambers 64. In the embodiment shown in FIG. 2, a single ignition source 80 is in heat exchange relationship with one or more of the pilot subchambers 64, as will be further detailed below. Alternately, more than one ignition source 80 may be provided, as will also be further detailed below. In a particular embodiment, the ignition source 80 is a glow plug or any other suitable heating element.

Because of the pilot injection and ignition, the main quantity of fuel injected by the main fuel injector 68 can be sized to define a lean fuel-air mixture in the combustion chambers 40. The main and pilot fuel injectors 68, 74 together provide for a stratified fuel-air mixture, defined by a stoichiometric or rich fuel-air mixture near the ignition source(s) 80 as provided by the pilot fuel injector(s) 74, and a lean fuel-air mixture in the combustion chambers 40 as provided by the main fuel injector 68.

The main quantity of fuel injected by the main fuel injector 68 is greater than the pilot quantity of fuel injected by the pilot fuel injector(s) 74. For example, in a particular embodiment, the pilot quantity injected by the pilot fuel injector(s) 74 has a value which can correspond to any one or any combination of the following: at least 0.5% of the total quantity of fuel; at least 2% of the total quantity of fuel; at least 5% of the total quantity of fuel; about 5% of the total quantity of fuel; at most 5% of the total quantity of fuel; at most 10% of the total quantity of fuel; at most 20% of the total quantity of fuel. Other values are also possible. For example, in embodiments where one of two pilot subchambers 64 is larger and configured as an "intermediate chamber" as described above, the pilot quantity of fuel may include 40-45% of the total quantity of fuel injected in the intermediate chamber and 5-10% of the total quantity of fuel in the smaller pilot subchamber; in this case, the pilot quantity may be at most 50% of the total quantity of fuel, so that the main quantity corresponds to at least 50% of the total quantity of fuel. In a particular embodiment, the total quantity of fuel corresponds to the sum of the main and pilot quantities; in another embodiment, one or more additional fuel injector(s) may be provided and the total quantity of fuel also includes the fuel injected by the additional fuel injector (s).

Figure 4:
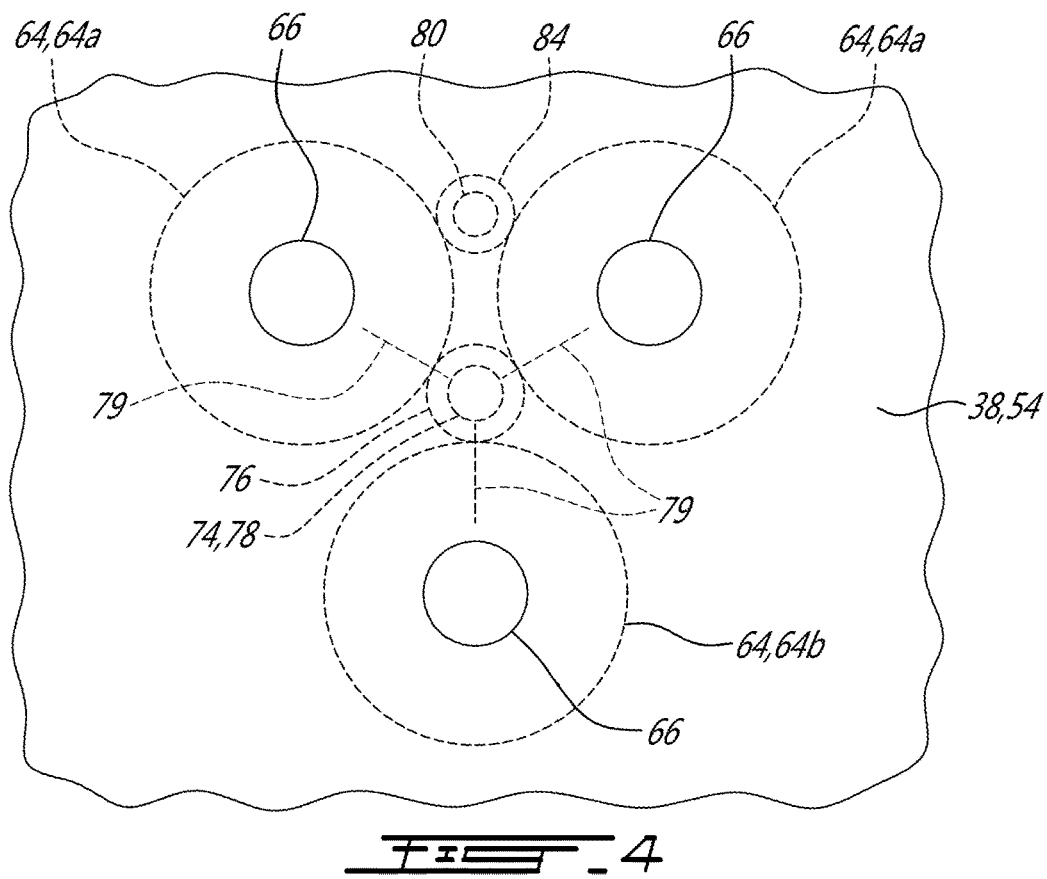
Figure 5:
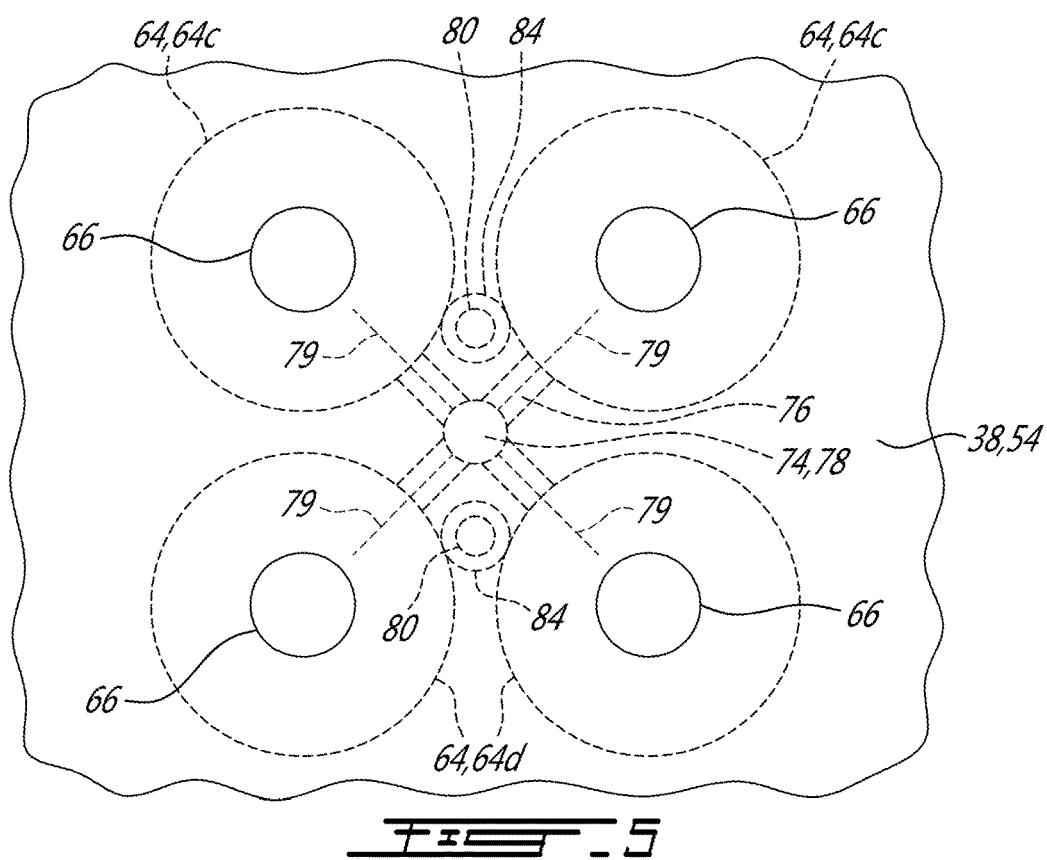

The pilot subchambers 64 can have any suitable position relative to one another. Examples of pilot subchamber configurations are shown in FIGS. 4-6, representing pilot subchambers 64 defined in or adjacent the peripheral wall 38 or end wall 54; it is understood that these examples are provided for illustrative purposes only and that any other suitable configuration may alternately be used. It is also understood that the circumferential position of the pilot subchambers 64, e.g. their distance from the intake port 48 and exhaust port 50, can be varied.

In the embodiment of FIG. 4, three pilot subchambers 64 are provided. The pilot subchambers 64 are spaced apart from each other and define separate volumes. The pilot subchambers 64 are shown here positioned in a triangular pattern; other configurations are also possible. Each pilot subchamber 64 communicates with the internal cavity through one respective transfer hole 66. The transfer holes 66 are spaced apart from one another and positioned in a triangular pattern. The pilot fuel injector 74 is received within a corresponding pilot injector opening 76 extending through the wall in which the subchambers 64 are defined (e.g. peripheral wall 38 or end wall 54). In the embodiment shown, the pilot injector opening 76 is defined adjacent all of the pilot subchambers 64, at or around the center of the triangular configuration defined by the pilot subchambers 64. The pilot injector opening 76 directly communicates with all of the pilot subchambers 64. The pilot subchambers 64 are in fluid communication with each other only via their fluid communication with the pilot injector opening 76 and their fluid communication with the internal cavity of the rotor assembly. The pilot injector 74 has a tip 78 configured to define at least one respective fuel jet 79 directed within each of the pilot subchambers 64.

The ignition source 80 (e.g. heating element such as glow plug) is received within an ignition source opening 84 extending through the wall in which the subchambers 64 are defined (e.g. peripheral wall 38 or end wall 54); the ignition source 80 is adjacent and in heat exchange relationship with at least one of the pilot subchambers 64. The ignition source opening 84 is located so that the ignition source 80 is able to ignite the fuel in the pilot subchambers 64 whether directly or indirectly. For example, in the embodiment shown, the ignition source opening 84 is adjacent two of the pilot subchambers 64a, and the ignition source 80 may be used to directly ignite the fuel in these two pilot subchambers 64a. The fuel within the third pilot subchamber 64b is ignited by the heat generated within the two pilot subchambers 64a directly ignited by the ignition source 80, and thus the fuel within the third pilot subchamber 64b is indirectly ignited by the ignition source 80. Other configurations are also possible, including, but not limited to, configurations with one glow plug for each pilot subchamber, and configurations with more than one glow plug for each pilot subchamber.

The ignition source opening 84 may be in fluid communication with the pilot subchamber(s) 64a in which direct ignition is performed, or may be fluidly separated therefrom, i.e. be in heat exchange relationship with the pilot subchambers 64a without fluidly communicating with the pilot subchambers 64a. In a particular embodiment, the material surrounding the pilot subchambers 64 and defining their inner surface includes heat resistant material which becomes sufficiently hot after the engine 12 has started so as to perform ignition of the fuel injected within the pilot subchambers 64 by the pilot fuel injector(s) 74; in this case, the glow plug or other suitable ignition source 80 may be used only at start up and be turned off when the engine 12 has reached its nominal temperature, so that the walls of the pilot subchambers 64 act as the ignition source once the engine 12 has reached its nominal temperature.

In the embodiment of FIG. 5, four pilot subchambers 64 are provided. The pilot subchambers 64 are also spaced apart from each other and define separate volumes. The pilot subchambers 64 are shown here positioned in a square pattern; other configurations are possible. Each pilot subchamber 64 communicates with the internal cavity through one respective transfer hole 66. The transfer holes 66 are spaced apart from one another and positioned in a square pattern. The pilot injector opening 76 extends adjacent all of the pilot subchambers 64, at or around the center of the square configuration defined by the pilot subchambers 64. The pilot injector opening 76 communicates with all of the pilot subchambers 64, and the pilot subchambers 64 are in fluid communication with each other only via their fluid communication with the pilot injector opening 76 and their fluid communication with the internal cavity of the rotor assembly. The pilot injector tip 78 is configured to define at least one respective fuel jet 79 directed within each of the pilot subchambers 64.

The embodiment shown includes two ignition source openings 84 and ignition sources 80 (e.g. heating elements such as glow plugs), so that the fuel within each of the pilot subchambers 64 can be directly ignited by the corresponding ignition source 80. Each ignition source 80 is adjacent and in heat exchange relationship with two of the pilot subchambers 64c, 64d. Alternately, one of the ignition sources 80 may be omitted, so that the fuel within two of the pilot subchambers 64c is ignited by the heat generated within the two subchambers 64d directly ignited by the ignition source 80. Other configurations are also possible, including, but not limited to, configurations with one glow plug for each pilot subchamber, and configurations with more than one glow plug for each pilot subchamber.

Similarly to FIG. 4, the ignition source opening(s) 84 may be in fluid communication with the pilot subchamber(s) 64 in which direct ignition is performed, or may be fluidly separated therefrom, i.e. be in heat exchange relationship with the pilot subchambers 64 without fluidly communicating with the pilot subchambers 64, and/or the ignition source 80 may be used only at start up and be turned off when the engine 12 has reached its nominal temperature, so that the walls of the pilot subchambers 64 act as the ignition source once the engine 12 has reached its nominal temperature.

In the embodiment of FIG. 6, three pilot subchambers 64 are provided. In this embodiment, the pilot subchambers 64 have intersecting cross-sections, and together define a common volume having a multi-lobe configuration. Each pilot subchamber 64 communicates with the internal cavity through a respective transfer hole 66. Accordingly, the common volume communicates with the internal cavity through a number of transfer holes 66 at least equal to that of the pilot subchambers 64. In the embodiment shown, multi-lobe common volume communicates with the internal cavity through a respective transfer hole 66 for each lobe. The transfer holes 66 are spaced apart are shown here positioned in a triangular pattern; other configurations are also possible.

The pilot injector opening 76 extends adjacent of and is in fluid communication with two of the pilot subchambers 64e, 64f. The pilot injector 74 thus communicates directly with two of the pilot subchambers 64e, 64f, and communicates with the third subchamber 64g indirectly, through the volume associated with one or more of the other pilot subchambers. The pilot injector tip 78 is configured to define at least one respective fuel jet 79 directed within each of the pilot subchambers 64.

In the embodiment shown, a single ignition source opening 84 and ignition source 80 (e.g. heating element such as glow plug) are shown, also positioned adjacent two of the pilot subchambers 64f, 64g; in the embodiment shown, the ignition source 80 is adjacent a different pair of the subchambers than the pilot fuel injector 74. Other configurations are also possible. Since the pilot subchambers 64 define a common volume, the fuel within the common volume of the pilot subchambers 64 may be directly ignited by the ignition source 80. Alternately, the ignition source 80 may directly ignite only a portion of the fuel of the common volume, and indirectly ignite the remainder of the fuel in the common volume as the ignited fuel triggers ignition of the remaining fuel. Other configurations are also possible, including, but not limited to, configurations with one glow plug for each pilot subchamber, and configurations with more than one glow plug for each pilot subchamber.

The ignition source opening 84 may be in fluid communication with the common volume of the pilot subchamber 64, or may be fluidly separated therefrom, i.e. be in heat exchange relationship with the pilot subchambers 64 without fluidly communicating with the pilot subchambers 64, and/or the ignition source 80 may be used only at start up and be turned off when the engine 12 has reached its nominal temperature, so that the walls of the pilot subchambers 64 act as the ignition source once the engine 12 has reached its nominal temperature.

In use and in accordance with a particular embodiment, combusting fuel in the rotary engine accordingly includes injecting the main quantity of fuel into at least two pilot subchambers and injecting the pilot quantity of fuel directly into a combustion chamber, with the pilot quantity being smaller than the main quantity. The fuel within the two pilot subchambers is ignited, then directed from each of the pilot subchambers into the combustion chamber via the at least one respective transfer hole. The transfer holes partially restrict the flow of the ignited fuel. The main quantity of fuel within the combustion chamber is ignited with the ignited pilot quantity of fuel from the pilot subchambers.

As detailed above, the pilot quantity of fuel may be injected and ignited in separate volumes (spaced apart pilot subchambers 64 such as shown in FIGS. 2-5) or in a common volume having a multi-lobe configuration (pilot subchambers 64 having intersecting cross-sections such as shown in FIG. 6).

The above description is meant to be exemplary only, and one skilled in the art will recognize that changes may be made to the embodiments described without departing from the scope of the invention disclosed. Other modifications which fall within the scope of the present invention will be apparent to those skilled in the art, in light of a review of this disclosure, and such modifications are intended to fall within the appended claims.

The invention claimed is:

1. A rotary engine comprising:
a rotor sealingly received within an internal cavity of a housing to define a plurality of combustion chambers;
an intake port and an exhaust port in use in fluid communication with the combustion chambers as the rotor rotates;
at least two pilot subchambers in parallel fluid communication with the internal cavity, the at least two pilot subchambers in use in fluid communication with the combustion chambers as the rotor rotates, the at least two pilot subchambers having intersecting cross-sections, the at least two pilot subchambers together defining a common volume having a multi-lobe configuration;
a main fuel injector in use in fluid communication with the combustion chambers as the rotor rotates, the main fuel injector located upstream of the at least two pilot subchambers with respect to a direction of rotation of the rotor;
at least one pilot fuel injector in fluid communication with the at least two pilot subchambers; and
at least one ignitor in heat exchange relationship with the at least two pilot subchambers.

2. The rotary engine as defined in claim 1, wherein the at least two pilot subchambers are each in fluid communication with the internal cavity via at least one respective transfer hole.

3. The rotary engine as defined in claim 1, wherein the at least one pilot fuel injector includes a common pilot fuel injector in fluid communication with the at least two pilot subchambers.

4. The rotary engine as defined in claim 1, wherein the at least one ignitor includes a first ignitor in heat exchange relationship with at least one of the at least two pilot subchambers.

5. The rotary engine as defined in claim 1, wherein the at least two pilot subchambers are spaced apart from one another, and are in fluid communication with each other only via the fluid communication with the at least one pilot fuel injector and the fluid communication with the internal cavity.

6. The rotary engine as defined in claim 1, wherein the at least two pilot subchambers include at least three pilot subchambers.

7. The rotary engine as defined in claim 1, further comprising a source of heavy fuel in fluid communication with the main fuel injector and the at least one pilot fuel injector.

8. The rotary engine as defined in claim 1, wherein the ignitor is a glow plug.

9. The rotary engine as defined in claim 1, wherein the rotary engine is a Wankel engine, the housing including a peripheral wall cooperating with two spaced apart end walls to define the internal cavity, the peripheral wall defining two lobes, the rotor having three circumferentially-spaced apex portions in sealing engagement with the peripheral wall and separating the combustion chambers.

10. The rotary engine as defined in claim 9, wherein the at least two pilot subchambers are each in fluid communication with the internal cavity via at least one respective transfer hole defined through the peripheral wall.

11. The rotary engine as defined in claim 1, wherein a volume of one of the combustion chamber varies between a minimum volume and a maximum volume with a difference between the maximum volume and the minimum volume defining a displacement volume, the at least two pilot subchambers having a total volume of at least 0.5% of the displacement volume and at most 3.5% of the displacement volume.

12. The rotary engine as defined in claim 1, wherein a volume of one of the combustion chambers varies between a minimum volume and a maximum volume, a combustion volume being defined as a sum of the minimum volume and of a total volume of the at least two pilot subchambers, the total volume of the at least two pilot subchambers being at least 5% of the combustion volume and at most 25% of the combustion volume.

13. The rotary engine as defined in claim 1, wherein the at least two pilot subchambers are defined in an insert received in a wall of the housing, the insert made of a material having a greater heat resistance than a material of the wall of the housing.

14. A compound engine assembly including:
the rotary engine as defined in claim 1,
a compressor in fluid communication with the intake port of the rotary engine, and
a turbine in fluid communication with the exhaust port of the rotary engine, the turbine having a turbine shaft compounded with an engine shaft drivingly engaged to the rotor.

15. A rotary engine comprising:
a rotor sealingly received within an internal cavity of a housing to define a plurality of combustion chambers;
an intake port and an exhaust port in use in fluid communication with the combustion chambers as the rotor rotates;
at least three pilot subchambers in parallel fluid communication with the internal cavity, the at least three pilot subchambers in fluid communication with the combustion chambers;
a main fuel injector in use in fluid communication with the combustion chambers as the rotor rotates, the main fuel injector located upstream of the at least two pilot subchambers with respect to a direction of rotation of the rotor;
at least one pilot fuel injector in fluid communication with the at least two pilot subchambers; and
at least one ignitor in heat exchange relationship with the at least two pilot subchambers.

16. A Wankel engine comprising:
a rotor sealingly received within an internal cavity of a housing to define a plurality of combustion chambers, the housing including a peripheral wall cooperating with two spaced apart end walls to define the internal cavity, the peripheral wall defining two lobes, the rotor having three circumferentially-spaced apex portions in sealing engagement with the peripheral wall and separating the combustion chambers;
an intake port and an exhaust port in use in fluid communication with the combustion chambers as the rotor rotates;
at least two pilot subchambers in parallel fluid communication with the internal cavity, the at least two pilot subchambers in fluid communication with the combustion chambers, wherein the at least two pilot subchambers are each in fluid communication with the internal cavity via at least one respective transfer hole defined through the peripheral wall;
a main fuel injector in use in fluid communication with the combustion chambers as the rotor rotates, the main fuel injector located upstream of the at least two pilot subchambers with respect to a direction of rotation of the rotor;
at least one pilot fuel injector in fluid communication with the at least two pilot subchambers; and
at least one ignitor in heat exchange relationship with the at least two pilot subchambers.

17. A rotary engine comprising:
a rotor sealingly received within an internal cavity of a housing to define a plurality of combustion chambers;
an intake port and an exhaust port in use in fluid communication with the combustion chambers as the rotor rotates;
at least two pilot subchambers in parallel fluid communication with the internal cavity, the at least two pilot subchambers in use in fluid communication with the combustion chambers as the rotor rotates;
a main fuel injector in use in fluid communication with the combustion chambers as the rotor rotates, the main fuel injector located upstream of the at least two pilot subchambers with respect to a direction of rotation of the rotor;
at least one pilot fuel injector in fluid communication with the at least two pilot subchambers; and
at least one ignitor in heat exchange relationship with the at least two pilot subchambers, wherein a volume of one of the combustion chamber varies between a minimum volume and a maximum volume with a difference between the maximum volume and the minimum volume defining a displacement volume, the at least two pilot subchambers having a total volume of at least 0.5% of the displacement volume and at most 3.5% of the displacement volume.

18. A rotary engine comprising:
a rotor sealingly received within an internal cavity of a housing to define a plurality of combustion chambers;
an intake port and an exhaust port in use in fluid communication with the combustion chambers as the rotor rotates;
at least two pilot subchambers in parallel fluid communication with the internal cavity, the at least two pilot subchambers in use in fluid communication with the combustion chambers as the rotor rotates;
a main fuel injector in use in fluid communication with the combustion chambers as the rotor rotates, the main fuel injector located upstream of the at least two pilot subchambers with respect to a direction of rotation of the rotor;
at least one pilot fuel injector in fluid communication with the at least two pilot subchambers; and
at least one ignitor in heat exchange relationship with the at least two pilot subchambers, wherein a volume of one of the combustion chambers varies between a minimum volume and a maximum volume, a combustion volume being defined as a sum of the minimum volume and of a total volume of the at least two pilot subchambers, the total volume of the at least two pilot subchambers being at least 5% of the combustion volume and at most 25% of the combustion volume.

19. A rotary engine comprising:

a rotor sealingly received within an internal cavity of a housing to define a plurality of combustion chambers;

an intake port and an exhaust port in use in fluid communication with the combustion chambers as the rotor rotates;

at least two pilot subchambers in parallel fluid communication with the internal cavity, the at least two pilot subchambers in use in fluid communication with the combustion chambers as the rotor rotates, wherein the at least two pilot subchambers are defined in an insert received in a wall of the housing, the insert made of a material having a greater heat resistance than a material of the wall of the housing;

a main fuel injector in use in fluid communication with the combustion chambers as the rotor rotates, the main fuel injector located upstream of the at least two pilot subchambers with respect to a direction of rotation of the rotor;

at least one pilot fuel injector in fluid communication with the at least two pilot subchambers; and at least one ignitor in heat exchange relationship with the at least two pilot subchambers.

* * * * *